US008518199B2

(12) United States Patent
Kost

(10) Patent No.: US 8,518,199 B2
(45) Date of Patent: Aug. 27, 2013

(54) DOUBLE TREAD

(75) Inventor: Troy Allen Kost, Leclaire, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 248 days.

(21) Appl. No.: 12/759,775

(22) Filed: Apr. 14, 2010

(65) Prior Publication Data

US 2011/0253275 A1 Oct. 20, 2011

(51) Int. Cl.
*B60C 11/02* (2006.01)
(52) U.S. Cl.
USPC .................... 156/96; 156/127; 152/209.6
(58) Field of Classification Search
USPC ............. 152/187, 209.6, 209.17; 156/96, 156/127
See application file for complete search history.

(56) References Cited

U.S. PATENT DOCUMENTS

| 1,266,100 | A | * | 5/1918 | Brown ..................... 152/210 |
| 1,817,287 | A | * | 8/1931 | Bell ......................... 264/157 |
| 1,897,974 | A | * | 2/1933 | Wolf ........................ 152/188 |
| 1,978,301 | A | * | 10/1934 | Fisher ...................... 428/217 |
| 3,945,417 | A | * | 3/1976 | Harrelson, Jr. ............ 152/209.6 |
| 3,963,066 | A | * | 6/1976 | Schwartz et al. ......... 152/187 |
| 5,044,411 | A | | 9/1991 | Doll |
| 5,275,218 | A | | 1/1994 | Nakayama et al. |
| 5,342,462 | A | | 8/1994 | King et al. |
| 5,445,691 | A | | 8/1995 | Nakayama et al. |
| 5,551,619 | A | | 9/1996 | Narron |
| 5,603,366 | A | | 2/1997 | Nakayama et al. |
| 6,918,544 | B2 | | 7/2005 | Ferguson |
| 2005/0211351 | A1 | | 9/2005 | Majumdar et al. |
| 2009/0049717 | A1 | * | 2/2009 | Kayashima ............... 36/32 R |

OTHER PUBLICATIONS

Kost, Troy A., U.S. Appl. No. 12/759,786 Double Tread, Kost, Troy A. Apr. 14, 2010, pp. 1-16, United States.
International Tire and Rubber Association Foundation, Inc., Understanding Retreading, http://www.retread.org/index.cfm/FuseAction/Understanding_Retreading.htm, 2001, 16 pages, International Tire and Rubber Association Foundation, Inc., Louisville, United States.
Dakin Flathers, Bandknife Blades, http://pdf.directindustry.com/pdf/dakin-flathers/bandknife-blades-54696-40917.html, Dec. 14, 2009, 1 page, Dakin Flathers, United States.
Forrest Mfg. Co., Horizontal Band Saw, http://www.forrestmfg.com/horizontal-bandsaws.php, Dec. 14, 2009, 1 page, Forrest Mfg. Co., Houston, United States.

* cited by examiner

*Primary Examiner* — Steven D Maki
*Assistant Examiner* — Robert Dye

(57) ABSTRACT

Embodiments of the invention are used to provide ways of tire tread molding and retreading with a double tread rubber body having a unitary structure that comprises two treads in order to remove the need for buffing an oxide layer typically associated with tread molding and curing. Embodiments of the double tread molding and retreading methods also remove the need for cementing the cured tread to prevent future oxidation buildup. Once the double tread is cured and cooled, it is cut along the centerline with a double tread separation apparatus to expose a soft non-oxidized inner rubber. The cutting is much less energy intensive when compared to buffing with an expendable wire brush. There is no risk of spots of oxidized rubber being missed as is the case with buffing. There is little or no dust created.

12 Claims, 7 Drawing Sheets

DOUBLE TREAD

FIELD OF THE INVENTION

This invention relates generally to the field of tire manufacturing and repair and more specifically to tire retreading.

BACKGROUND OF THE INVENTION

Tire retreading is a process by which used tires receive a new tread to extend their service life. Since the useful life span of most tires goes far beyond that of their tread component, reusing old tire casings for retreading is both cost effective and environmentally friendly. Generally, retreading involves removing the old worn out tread from the tire casing and bonding a new tread onto the cleaned tire by a process of vulcanization.

New tread for precured retreading applications is typically molded as a single piece with the tread pattern on one side. The opposing side is later prepared to bond to the tire. During the molding and curing process a hard, shiny and smooth oxide layer forms on the tread. To prepare the tread to bond to the tire this layer must be removed. The removal of this layer is typically done with buffing of the tread using several stages of expendable wire brushes in an energy intensive process. The tread buffing process is not only energy intensive but also labor intensive. Once the oxidation layer is buffed off the precured tread, the new tread is cemented in order to prevent future oxidation. The cement is then covered with gray polyfilm for ultraviolet light protection, and the tread is rolled up and covered with stretch wrap to protect it from moisture, dirt, and containments. Since tread is typically sold by unit weight, cementing, adding polyfilm, and stretch wrapping the new tread increases its cost.

BRIEF SUMMARY OF THE INVENTION

Embodiments of the invention are used to provide ways of tire tread molding and retreading with a double tread rubber having a unitary tread body structure that comprises two treads in order to remove the need for buffing an oxide layer typically associated with tread molding and curing. Embodiments of the double tread molding and retreading methods described herein also remove the need for cementing the cured tread to prevent future oxidation buildup. Among various other advantages, is an increase in the number of treads produced per press cycle, which results in additional cost savings. Once the double tread is cured and cooled, it is cut along the centerline with a double tread separation apparatus to expose the soft non-oxidized inner rubber. The cutting is much less energy intensive when compared to buffing with an expendable wire brush. There is no risk of spots of oxidized rubber being missed as is the case with buffing. There is little or no dust created.

In one aspect of the invention, a double tread for tire retreading is provided, the double tread comprising (a) a first design side comprising an upper surface having a first tread pattern molded in a unitary tread body, and (b) a second design side comprising a lower surface having a second tread pattern molded in the unitary tread body, the second tread pattern opposingly oriented with respect to the first tread pattern across a plane between and parallel to the upper and lower surfaces, the first and second tread patterns adapted for being individually applied to a tire casing.

In another aspect of the invention, a method is provided for manufacturing a retreaded tire comprising (a) procuring a double tread, the double tread comprising a first design side comprising an upper surface having a first tread pattern molded in a unitary tread body, and a second design side comprising a lower surface having a second tread pattern molded in the unitary tread body, the second tread pattern opposingly oriented with respect to the first tread pattern across a plane between and parallel to the upper and lower surfaces of the unitary tread body, (b) cutting the double tread along the plane to separate the upper and lower surfaces of the unitary tread body, and (c) individually applying one of the upper and lower surfaces to a tire casing within a predetermined time period after the cutting.

In yet another aspect of the invention, a method for manufacturing a double tread for tire retreading is provided, the method comprising (a) forming the double tread via a tread mold, the double tread comprising a first design side comprising an upper surface having a first tread pattern molded in a unitary tread body, and a second design side comprising a lower surface having a second tread pattern molded in the unitary tread body, the second tread pattern opposingly oriented with respect to the first tread pattern across a plane between and parallel to the upper and lower surfaces, the first and second tread patterns adapted for being individually applied to a tire casing; and (b) curing the double tread.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
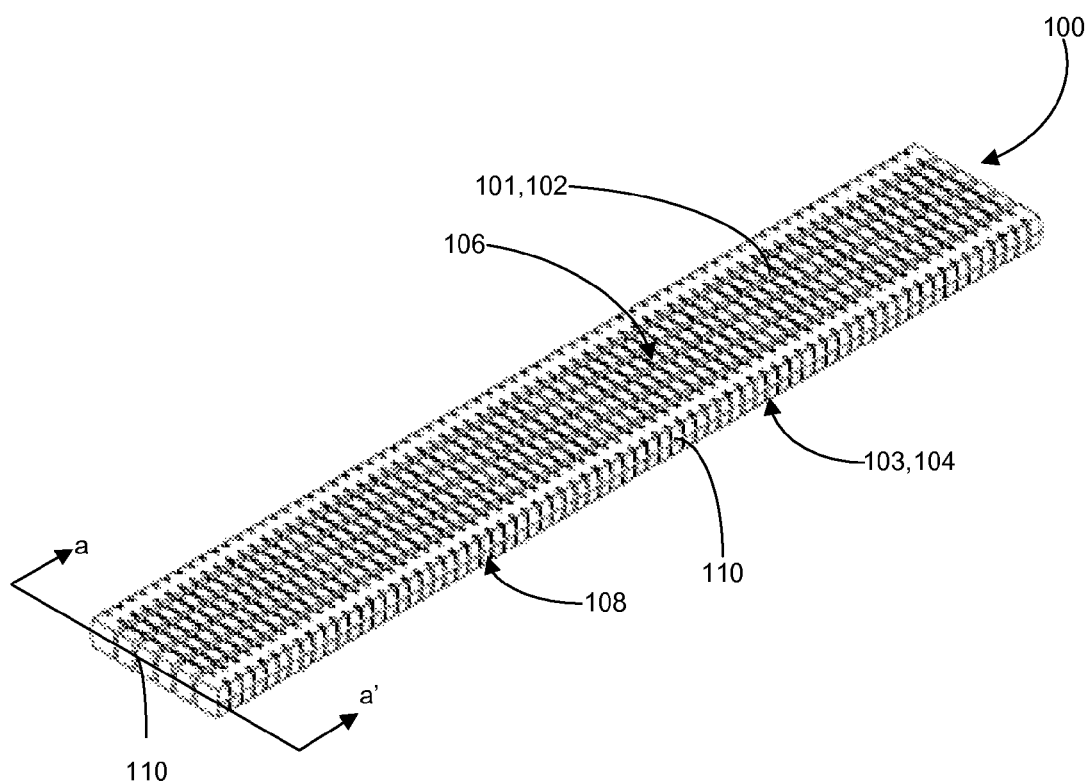
FIG. 1 is a schematic diagram illustrating a one-piece double tread for retreading tires, accordance with an embodiment of the invention.

Turning to FIG. 1, an embodiment of a double tread rubber strip for retreading tires with precured tread is shown. The tread body 100 employs a one-piece, or unitary, mold construction and includes two design sides 101, 103 respectively comprising upper and lower surfaces 102, 104 with dedicated tread patterns 106, 108 molded thereon. Specifically, the lower tread pattern 108 is opposingly oriented with respect to the upper tread pattern 106 across a plane a-a' disposed in between and parallel to the upper and lower surfaces 102, 104 and defining a centerline 110 between them. Preferably, the tread patterns 106, 108 on each design side are identical. In an alternative embodiment, the tread patterns 106, 108 are dissimilar. The double tread unitary mold construction and retreading techniques discussed herein remove the need for buffing an oxide layer typically associated with molding and curing of tread rubber, the need to apply a cement layer to the cured tread to prevent future oxidation, as well as the need to apply a polyfilm for UV protection and stretch wrap to prevent contamination of the buffed surface.

Figure 2:
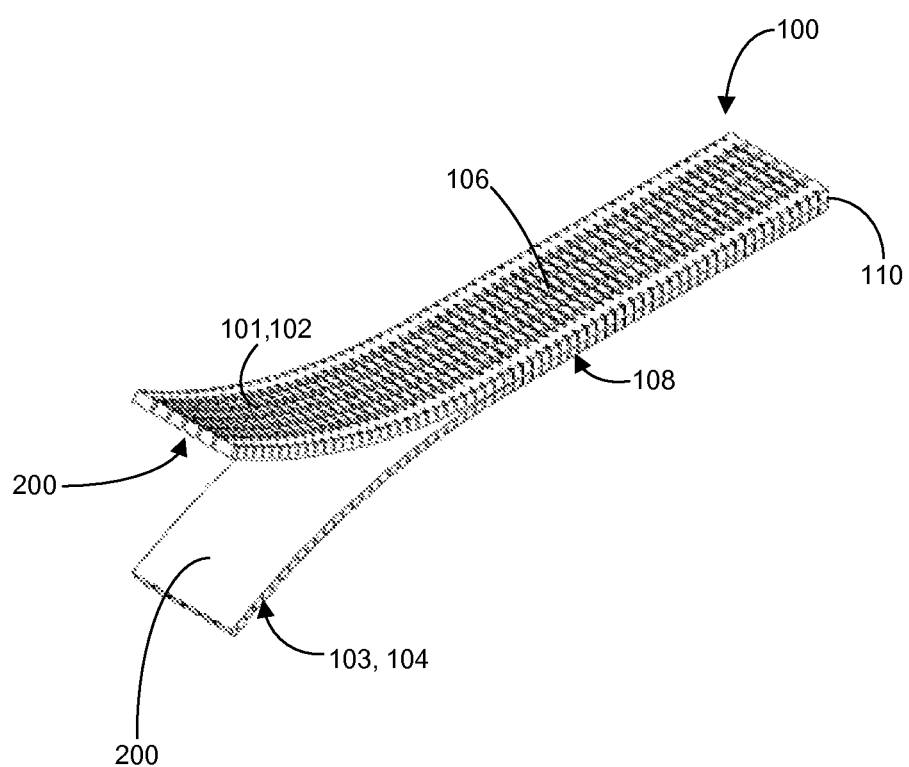
FIG. 2 is a schematic diagram illustrating the double tread of FIG. 1 that is cut along a centerline to expose a soft non-oxidized inner layer, in accordance with an embodiment of the invention.

As illustrated in FIG. 2, after the double tread is cured and cooled, it is cut along the centerline 110 with a double tread separation apparatus (described below in FIGS. 2a-2b) to expose a soft non-oxidized inner rubber layer 200 between the upper and lower tread surfaces 102, 104 for subsequent bonding to a tire casing. The process of cutting the double tread body 100 to separate the two tread design sides 101, 103 and corresponding tread patterns 106, 108 is significantly less energy intensive compared to traditional buffing of a single tread mold with an expendable wire brush in order to remove the oxide layer formed after the curing process. There is no risk of spots of oxidized rubber being missed as is the case with buffing. Additionally, there is little or no dust created.

Figure 2A:
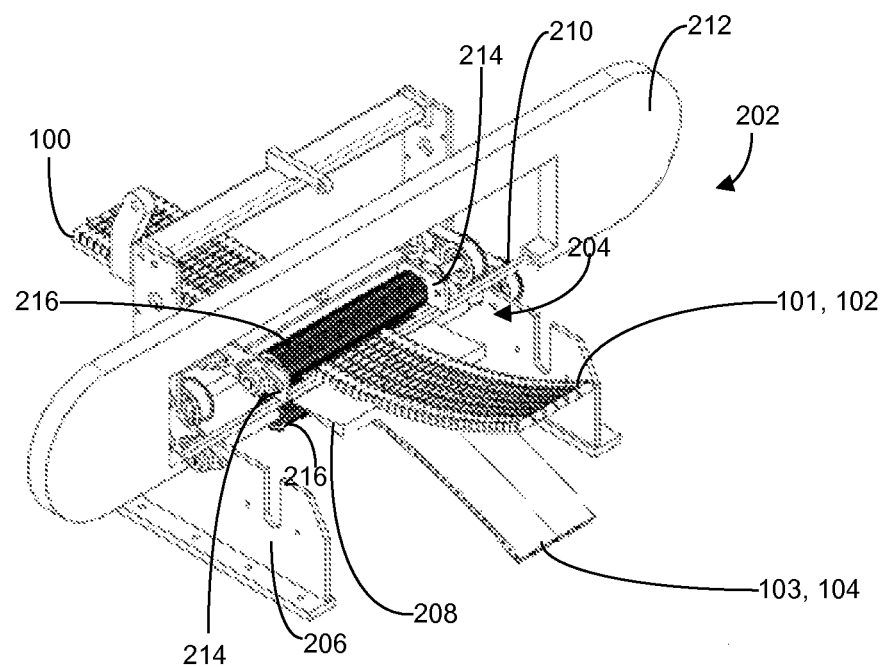
FIGS. 2a and 2b are schematic diagrams illustrating a double tread separation apparatus for separating the double tread of FIG. 1 along its centerline, in accordance with an embodiment of the invention.
Figure 2B:
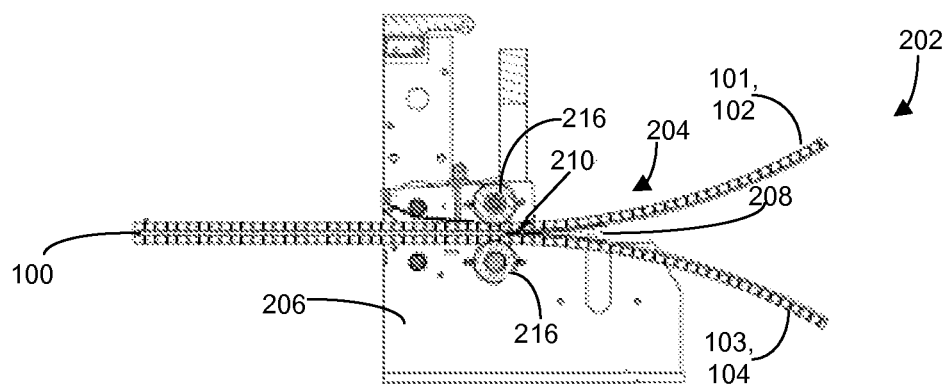

With reference to FIGS. 2a-2b, the double tread separation apparatus 202 comprises a double tread splitting mechanism 204, connected to a frame 206, for receiving the double tread body 100 and uniformly separating the upper and lower surfaces 102, 104 into two separate tread strips. In one embodiment, the double tread splitting mechanism 204 comprises a splitter member 208 disposed behind a blade 210 and having a gradient for guiding the separated upper and lower surfaces of the double tread body 100 thereon and away from the double tread separation machine 202. In an embodiment, the blade 210 is mounted to a band saw 212, such as a horizontal band saw. In a further embodiment, the splitter member 208 is mounted directly to the blade 210. Alternatively, the splitter member 208 is mounted to a feed roller support structure 214. The double tread separation apparatus 202 further comprises powered feed rollers 216 that accept and guide the double tread body 100 and convey it toward the blade 210 for separating along the centerline. Preferably, the feed rollers 216 are capable of vertically and/or horizontally floating their position relative to the blade 210 in order to center the double tread body 100 along its centerline 110. In one embodiment, the feed rollers are mechanically floated. In another embodiment, the feed rollers are floated using electronic controls.

Figure 3:
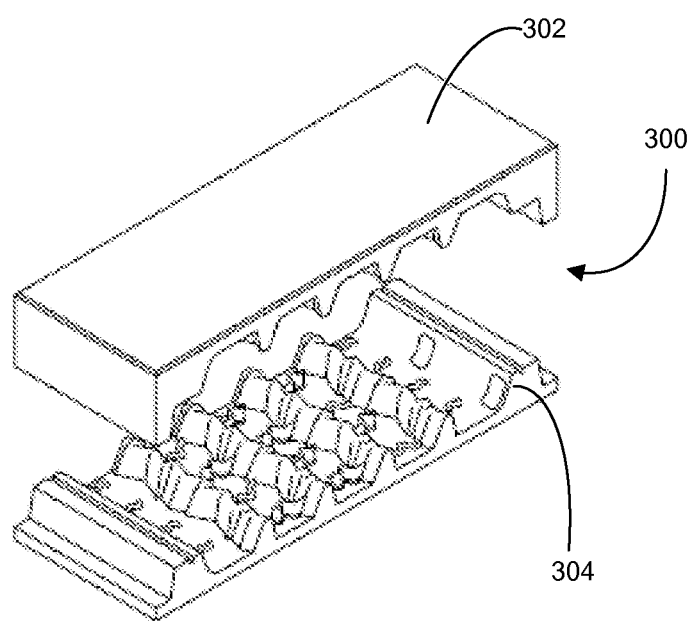
FIG. 3 is a schematic diagram illustrating an open position of a double mold for molding the tread of FIG. 1, in accordance with an embodiment of the invention.
Figure 4:
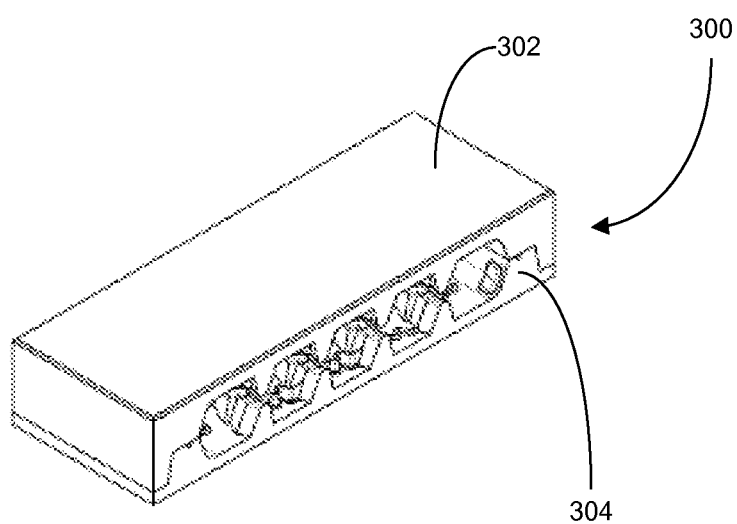
FIG. 4 is a schematic diagram illustrating a closed position of a double mold for molding the tread of FIG. 1, in accordance with an embodiment of the invention.

The double tread body 100 is molded via a double mold 300, as illustrated in FIGS. 3 and 4, showing its open and closed positions, respectively. The double mold 300 comprises an upper mold portion 302 and a lower mold portion 304 for contemporaneously molding two tread patterns 106, 108 onto the respective upper and lower surfaces 102, 104 of the tread body 100 via a mold press. Preferably, the number of platens in the mold press is reduced, as compared to a single tread mold, to accommodate the upper and lower mold portions 302, 304.

Figure 5:
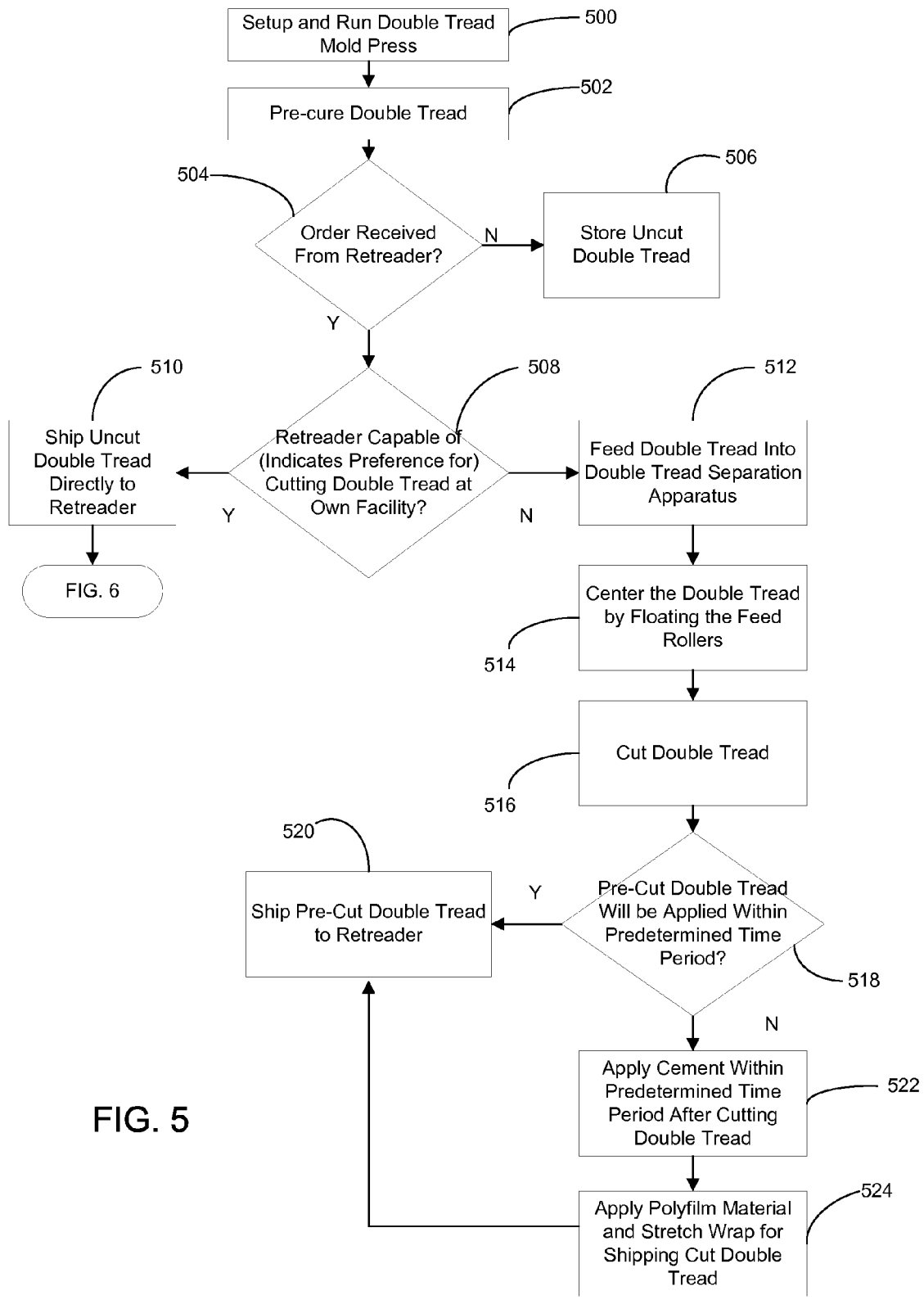
FIG. 5 is a flow chart of a method for manufacturing a double tread of FIG. 1, in accordance with an embodiment of the invention.

Turning to FIG. 5, an embodiment of a method for manufacturing a double tread for tire retreading is shown. In step 500, a mold press is setup with a predetermined number of platens to accommodate the upper and lower mold portions of the double mold 300. The molded unitary double tread body 100 is then cured and cooled, step 502. Next, if the tread manufacturer has not yet received an order for the double tread body 100 from a tire retreading facility, the tread manufacturer stores the double tread 100, steps 504-506. Advantageously, the one-piece unitary molding of the double tread body 100 allows long-term storage without the need for buffing and cementing by preventing the initial formation of an oxide layer between the upper and lower tread surfaces 102, 104 since the soft inner rubber layer 200 between them remains unexposed until the double tread is separated. When the tread manufacturer receives an order for the double tread 100, as well as an indication that the retreader is capable of and/or prefers to separate the treads at its own facility, the tread manufacturer ships uncut double tread body 100 directly to the retreader, steps 508-510. Since the uncut double tread 100 does not require an application of a cement layer to the interior surface of the tread to prevent oxidation, the application of a polyfilm, or the need to stretch wrap, the tread manufacturer is able to reduce its cost per unit (e.g., per pound) of produced tread.

When the retreading facility indicates a preference for receiving pre-cut tread, the tread manufacturer separates the two design sides having respective tread patterns of the unitary tread body 100 into separate tread strips, such as by using a double tread separation apparatus 202 discussed in connection with FIGS. 2a-2b above, step 512. To ensure that the double tread body 100 is separated evenly along the centerline 110, the tread body 100 is centered along the blade 210 by floating the feed rollers 216 of the double tread separation apparatus, step 514. In one embodiment, the feed rollers are mechanically floated. In another embodiment, the feed rollers are floated using electronic controls. Once the unitary tread body 100 is centered along the blade 210 of the double tread separation apparatus 202, the upper and lower surfaces 102, 104 and corresponding tread patterns 106, 108 are separated by cutting along the centerline 110, step 516. This exposes the non-oxidized inner layer 200 between the upper and lower surfaces of the tread body 100. Therefore, the pre-cut double tread needs to be applied to a tire casing within a predetermined time period beyond which oxidation of the inner layer 200 is likely to occur. Preferably, the pre-cut double tread needs to be applied to a tire casing within approximately seventy two (72) hours after cutting and separating the unitary tread body 100. Hence, in step 518, if the tread order indicates that the retreading facility will apply the separated treads 106, 108 to a tire casing within the 72 hour time period, the tread manufacturer ships the separated tread to the retreading facility without cementing since oxidation of the exposed inner layer 200 is not likely to occur, step 520. As discussed above, both the tread manufacturer and the retreading facility realize cost savings due to a reduction in the shipping weight of the non-cemented tread and absence of the need to buff any oxidation off the double tread body 100. In steps 522-524, if the retreading facility is unlikely to be able to use the separated double tread within the predetermined time, the tread manufacturer applies a cement layer to the exposed inner layer 200 for each separated tread surface 102, 104 and packages the separated tread surfaces using a polyfilm material, such as polyethylene, and stretch wrap for shipping, steps 522-524.

Figure 6:
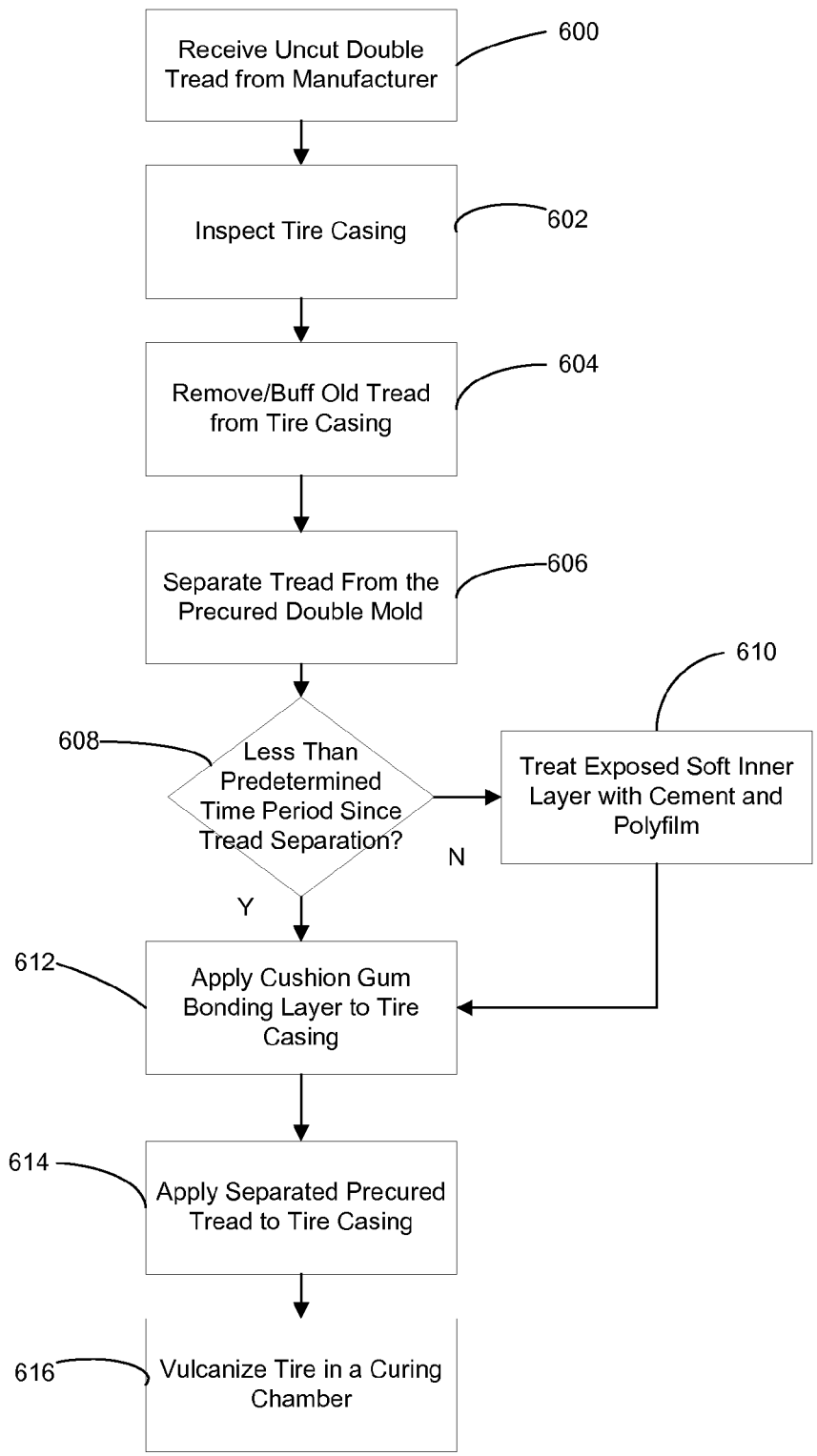
FIG. 6 is a flow chart of a method for retreading a tire using an uncut unitary double tread body of FIG. 1, in accordance with another embodiment of the invention.

Turning to FIG. 6, an embodiment of a method for retreading a tire using an uncut unitary double tread 100 is shown. Preferably, a dedicated retreading facility processes the double tread 100, however alternative embodiments include a retreading plant collocated with a tread manufacturing facility. In steps 600-604, after receiving the uncut unitary double tread 100 from the tread manufacturer, the retreading facility inspects used tire casings and removes old tread by buffing it off the used tire. Next, in step 606, the retreading facility separates the cured double tread mold 100 into two tread surfaces in accordance with steps 512-516 discussed above in connection with FIG. 5. In steps 608-610, if more than a predetermined time period is likely to go by after tread separation (e.g., the retreading plant will be non-operational longer than 72 hours), the exposed inner layer 200 at each of the separated upper and lower tread surfaces 106, 108 is treated with cement to prevent oxidation buildup and polyfilm material is also applied. Otherwise, in steps 612-616, the retreading facility completes the retreading process within the predetermined time period after cutting the tread body 100 by applying a cushion gum bonding layer to the tire casing, applying the separated upper or lower tread surface with a corresponding tread pattern design to the tire casing, and vulcanizing the retreaded tire in a curing chamber, such as by way of electric or steam heated curing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for manufacturing a retreaded tire comprising:
   providing a double tread, the double tread comprising a first design side comprising an upper surface having a first tread pattern molded in a unitary tread body, and a second design side comprising a lower surface having a second tread pattern molded in the unitary tread body, the second tread pattern opposingly oriented with respect to the first tread pattern across a plane between and parallel to the upper and lower surfaces of the unitary tread body;
   cutting the double tread along the plane to separate the upper and lower surfaces of the unitary tread body such that a soft, non-oxidized inner rubber layer is exposed along a region defined by the cut along the plane of the double tread, wherein said region defined by the cut is wider than each of the upper and lower surfaces of the unitary tread body; and
   individually applying one of the upper and lower surfaces to a tire casing within a predetermined time period after the cutting or cementing at least one of the upper and lower surfaces along the region defined by the cut along the plane of the double tread to protect from future oxidation buildup when the applying step occurs outside of the predetermined time period.

2. The method of claim 1 further comprising vulcanizing the tire casing with the applied one of the upper and lower surfaces.

3. The method of claim 1 further comprising buffing a preexisting tread from the tire casing prior to the applying step.

4. The method of claim 1 further comprising centering the unitary tread body along the plane prior to the cutting step.

5. The method of claim 1 further comprising storing the unitary tread body beyond the predetermined time period prior to the cutting step.

6. A method for manufacturing a double tread for tire retreading, the method comprising:
   forming the double tread via a tread mold, the double tread comprising a first design side comprising an upper surface having a first tread pattern molded in a unitary tread body, and a second design side comprising a lower surface having a second tread pattern molded in the unitary tread body, the second tread pattern opposingly oriented with respect to the first tread pattern across a plane between and parallel to the upper and lower surfaces, wherein the unitary tread body has a width along the plane that is larger than a width along each of the upper and lower surfaces such that the first and second tread patterns are adapted for being individually applied to a respective tire casing after the unitary tread body has been cured and separated along the plane to produce first and second treads;
   curing the double tread;
   cutting the double tread along the plane to produce the first and second treads, each presenting a soft, non-oxidized inner rubber layer; and
   cementing at least one of the upper and lower surfaces along a region defined by the cut along the plane of the double tread to protect from future oxidation buildup when the operation of individually applying the first and second tread patterns to a respective tire casing occurs outside of a predetermined time period after the double tread has been cut long the plane to produce the first and second treads.

7. The method of claim 6 further comprising cutting the double tread along the plane to separate the upper and lower surfaces of the unitary tread body in the absence of at least one of buffing and cementing at least one of the upper and lower surfaces along the plane.

8. The method of claim 7 further comprising utilizing at least one of the upper and lower surfaces for retreading a tire within a predetermined time period after the cutting.

9. The method of claim 8, wherein the predetermined period is 72 hours.

10. The method of claim 7 further comprising shipping at least one of the upper and lower surfaces to a retreading facility for utilizing the at least one of the upper and lower surfaces for retreading a tire within a predetermined time period after the cutting.

11. The method of claim 7 further comprising centering the double tread along the plane prior to the cutting step.

12. The method of claim 6 further comprising storing the cured unitary tread body beyond a predetermined time period, the predetermined time period configured for utilizing at least one of the upper and lower surfaces for retreading a tire after cutting the double tread along the plane to separate the upper and lower surfaces.

\* \* \* \* \*